Nov. 16, 1971   J. J. MATVEY   3,619,944

VEGETATION INHIBITING GUARD

Filed July 2, 1970   2 Sheets-Sheet 1

INVENTOR.
JOSEPH J. MATVEY
By
Arnold B. Silverman
Attorney

Nov. 16, 1971    J. J. MATVEY    3,619,944
VEGETATION INHIBITING GUARD
Filed July 2, 1970    2 Sheets-Sheet 2

INVENTOR.
JOSEPH J. MATVEY
By
Arnold B. Silverman
Attorney

United States Patent Office 3,619,944
Patented Nov. 16, 1971

3,619,944
VEGETATION INHIBITING GUARD
Joseph J. Matvey, 208 Orin St., Pittsburgh, Pa. 15235
Filed July 2, 1970, Ser. No. 51,973
Int. Cl. A01g 1/08
U.S. Cl. 47—33
10 Claims

ABSTRACT OF THE DISCLOSURE

A vegetation inhibiting member for protective placement adjacent exterior wall-like surfaces. At least one guard element having a substantially horizontal outer portion and an adjacent upwardly and inwardly directed inner portion. The guard may consist of a closed multi-sided frame. A plurality of guard elements defining a closed protective frame may be provided. Each guard element having an outer portion provided with a downwardly depending ground engaging leg and an inner portion having a downwardly depending inner ground engaging leg. The inner portion having a generally upwardly open seal receiving channel. Seal means for assuming sealing contact with the wall-like element having one end secured within the channel and extending upwardly and inwardly therefrom. Hidden splice means for joining abutting edges of guard elements and corner elements which serve to define the closed frame. Concealed anchor means for penetration into the underlying earth may be provided.

BACKGROUND OF THE INVENTION

Field of the invention

This invention relates to a vegetation inhibiting member adapted for effective sealing engagement with a wall-like surface and more specifically this invention relates to such a member which is adapted to form a closed multi-sided vegetation inhibiting frame which prevents the growth of vegetation in the earth underlying the same and between the member and the wall-like surface or surfaces with which it is engaged.

Description of prior art

As a result of the ever increasing labor cost of maintaining control of vegetation in residential and commercial environments and cemetery maintenance, there has been increased recognition of the need to adopt effective means for minimizing the amount of labor required. This same objective exists in connection with the desire of those doing their own maintenance of vegetation such as grass to increase the amount of leisure time available for recreation. In general, this trend has resulted in increased use of motorized maintenance equipment and a reduced amount of time consuming hand maintenance. While power devices such as power mowers effectively reduce the amount of time required to maintain open expanses of lawn, in lawn portions closely adjacent vertical wall-like surfaces and other obstructions such as houses, garden borders and grave marking devices in cemeteries, the power mowers cannot travel sufficiently close to the wall-like surfaces to entirely eliminate the need for hand trimming. Traveling too close risks damaging contact between the mower and the marking device. As the vegetation in the absence of regular trimming tends to grow out of control and become unsightly, hand trimming has been a necessity if an aesthetically pleasing appearance is to be maintained.

It has been known to employ various types of physical barriers to extension of vegetation growth into undesired areas. For example, on lawns it has been known to place barriers such as edging strips, wood chips, stones or other obstructions to grass extension. In connection with the growth of grass around grave marking structures such as tombstones, it has been suggested to provide a structural border which is placed around the tombstone base in order to prevent vegetation growth thereunder. See U.S. Pat. 3,477,181.

With respect to such barrier structures it is important that they be so designed as to effectively inhibit vegetation while providing a durable and economical means of accomplishing vegetation control. The structure must be capable of withstanding variations in climate without deterioration in structure or appearance. Also, it must have sufficient structural integrity to resist occasional accidental or intentional loads placed on it by either human beings stepping on the same or equipment such as power mowers rolling over the same. In addition, the protective members must be capable of being easily installed by means of relatively unskilled or semi-skilled labor. Finally, for certain installations such as cemetery use these required features must be so combined as to satisfy the rigid requirements with regard to both performance and appearance established by the various cemeteries.

Many of the prior art devices have been defective with respect to one or more of the above enumerated properties. As a result there remains a very substantial need for a vegetation inhibiting member adapted for use with a broad range of exterior wall-like surfaces where the above characteristics are necessary or desirable.

SUMMARY OF THE INVENTION

The vegetation inhibiting member of this invention provides the above described desirable features and solves the above described problems in an effective manner.

The vegetation inhibiting member is adapted for sealed substantially coextensive engagement with one or more exterior wall-like surfaces in order to prevent vegetation growth therebetween and under the vegetation inhibiting member. It may be provided in the form of a closed member composed of a number of guard elements and corner elements which provide a substantially coextensive, complementary configuration with respect to the wall surfaces to be engaged.

The frame element of this invention has a cross sectional configuration which provides a substantially horizontal outer portion and an adjacent upwardly and inwardly directed portion. The outer portion has an outer ground engaging leg and an inner portion has a downwardly depending inner ground engaging leg. The inner portion has a generally upwardly open seal receiving channel. A sealing strip has a generally sheet-like portion and a depending locking portion engaged within the seal receiving channel. The sealing strip is adapted to resiliently, sealingly engage the vertical wall surface.

A uniform exterior frame appearance is provided by abutting joints established between the respective guard elements and corner elements by means of a splice element which is hidden when in secured position. The splice elements are adapted to be slidingly received in end to end fashion in underlying relationship with the frame defining elements. Fastening means secure the splice elements to the abutted frame elements. The splice element has an upper surface which is of complementary configuration with respect to the outer and inner portions of the guard and corner elements. Ground anchoring means may be formed within or secured to splice elements or similarly configurated elements positioned at points other than the butt joints in order to provide downward penetration into the underlying earth to firmly secure the frame elements in position.

A substantially rigid frame of fixed dimension having effective ground engagement and resilient substantially continuous sealing engagement with respect to the wall-like surface or surfaces being protected is to be provided.

It is an object of this invention to provide a vegetation inhibiting structure which effectively and economically serves to retard the growth of grass, weeds and other undesired vegetation adjacent to exterior wall-like structures.

It is another object of this invention to provide a closed frame like structure composed of effectively joined adjacent vegetation inhibiting elements which provides a uniform aesthetically pleasing exterior appearance and has hidden joint forming elements.

It is another object of this invention to provide such a frame wherein sealing means of a resilient nature may be mechanically interengaged with the inner opening defining portion of the closed frame in order to provide for effective sealing against tombstones and other similar exterior multi-sided structures.

It is another object of this invention to provide a substantially rigid frame element which is adapted to effectively prevent vegetation growth thereunder and also to provide mechanical engagement for a continuous sealing strip to prevent vegetation growth between the sealing strip and the wall-like surface with which it is engaged.

It is yet another object of this invention to provide such a frame structure which may be economically produced and readily installed by unskilled or semi-skilled labor and which provides hidden anchoring means in order to effectively secure the same in sealing vegetation inhibiting position.

These and other objects of the invention will be more fully understood from the following description of the invention, on reference to the illustrations appended hereto.

DESCRIPTION OF THE PREFERRED EMBODIMENTS

Figure 1:
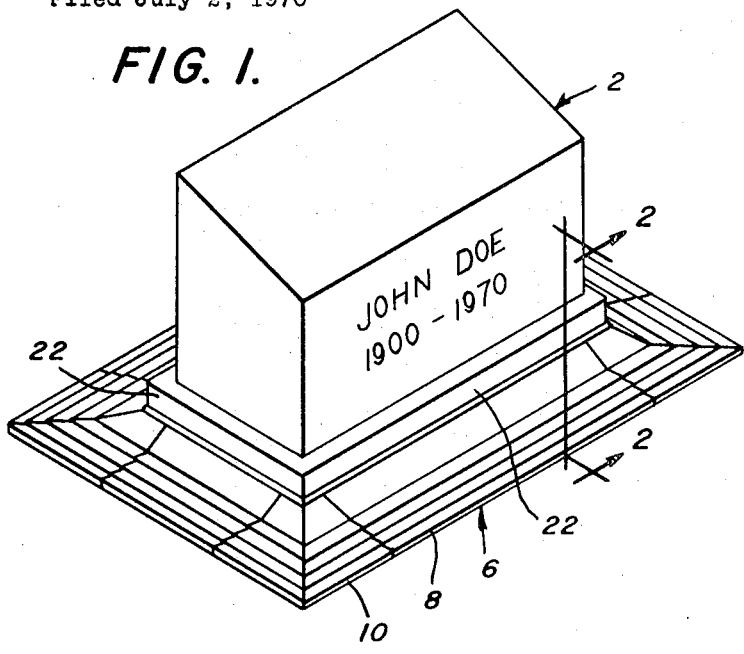
FIG. 1 illustrates a perspective view of a vegetation inhibiting member in accordance with this invention protectively surrounding a tombstone.
Figure 2:
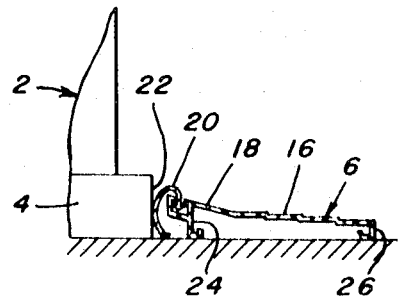
FIG. 2 is a partial sectional elevation illustrating a detail of the portion of the frame taken through 2—2 of FIG. 1.

Referring now more specifically to the drawings with reference to FIGS. 1 and 2, there is shown a tombstone 2 having a tombstone base 4 and a protective frame 6. The frame is composed of guard elements 8 and corner elements 10 which are joined to provide a uniform fixed dimensional frame 6.

Referring to FIG. 2, it is seen that protective frame 6 is provided with a cross sectional configuration in both the guard elements 8 and corner elements 10 having a horizontal outer portion 16 and an upwardly and inwardly directed inner portion 18. A sealing strip 20 is secured to inner portion 18 and is folded downwardly so as to establish a resilient sealed relationship with respect to vertical surface 22 of tombstone base 4. This sealed relationship is preferably substantially coextensive with all vertical surfaces 22 around the entire tombstone base.

The inner portion 18 of protective frame 6 has a downwardly depending inner ground engaging leg 24. The outer portion 16 has a downwardly depending ground engaging leg 26. It will therefore be appreciated that the inner and outer portions 16, 18 of frame 6 provide inner and outer light barriers which effectively prevent appreciable light entry under the generally hollow frame 6. Also, the frame is sufficiently low that an obstacle to upward vegetation growth is provided. In addition, as the sealing element 20 is mechanically interengaged with inner portion 18 of frame 6 and is resiliently sealingly engaged with the vertical surface 22 of tombstone base 4 entry of light between the frame 6 and tombstone base 4 is prevented and a physical obstacle to the growth of vegetation is also provided. As used herein, the terms "earth," "ground" and words of similar import shall be employed interchangeably to refer to the underlying material over which the frame lies and protectively shelters be it earth as the term is generally understood or some substitute material such as a mulch, peat moss or other vegetation supporting substance.

Figure 3:
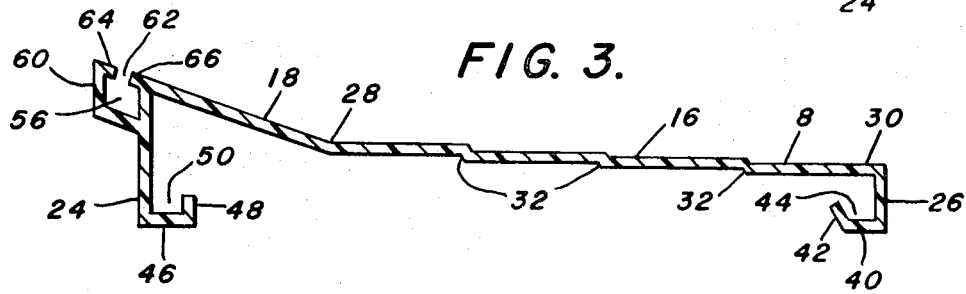
FIG. 3 illustrates a cross sectional view of a guard or corner element of this invention.

Referring to FIG. 3, a detailed cross sectional illustration of a guard element 8 or corner element 10 is shown. It is preferred that these elements have a substantially uniform cross sectional configuration throughout their longitudinal extent. It will be appreciated, however, that of necessity the mitered corner elements will have an angular undercut extremity. Also, the corner elements may conveniently be provided by actually mitering two straight elements which have been formed by extrusion or other convenient means and appropriately cut and joined by heat welding, adhesives or other suitable means. Alternatively, the corner elements might be molded as a single unitary structure. The frame element 6 shown in FIG. 3 has a substantially horizontal outer portion 16 which is connected to an inwardly and upwardly directed inner portion 18. The term "horizontal" as used herein in this context and with respect to splice element 90 includes structures having a slight reduction in elevation toward the outer extremity when the reductions are effected in finite stages as by steps 32 or by a gradual slope. This facilitates outward drainage of moisture impinging on the upper surface of frame 6. The inner portion is preferably of substantially smaller transverse width than the outer portion 16. The outer portion 16 between the intersection 28 with the inner portion and the outer edge 30 is reduced slightly in elevation through steps 32.

In the form shown in FIG. 3, outer ground engaging leg 26 terminates in a substantially horizontal inwardly directed flange 40 which has a generally upwardly directed free end 42. Leg 26, flange 40 and free end portion 42 cooperate to define upwardly open channel 44. Inner ground engaging leg 24 terminates in substantially horizontal outwardly directed flange 46 which in turn terminates with generally upwardly directed free end portion 48. Leg 24 cooperates with flange 46 and free end 48 to define upwardly open channel 50. As inner portion 18 slopes inwardly and upwardly, depending leg 24 has a length greater than depending leg 26. This difference in elevation is substantially equal to the increase caused by steps 32 within outer portion 16 plus the increase due to the inclination of inner portion 18. The undersurface of flanges 40, 46 are adapted to assume surface to surface contact with the underlying earth.

Referring now to the seal receiving channel 56 shown in FIG. 3, it is seen that the channel is defined by an upper portion of leg 24, a base portion 58 and an outer substantially vertical leg 60. The upwardly open channel 56 has a throat portion 62 defined by confronting ends of flanges 64, 66. This channel structure is adapted for receipt of a locking element of a seal member and is adapted to assume mechanical interengagement therewith.

Figure 5:
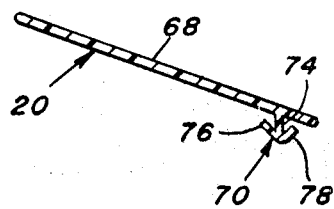
FIG. 5 illustrates a form of sealing element contemplated by this invention.

Referring now to FIG. 5, one form of sealing element 20 contemplated by this invention is there illustrated. The sealing element which is preferably made from a resilient plastic material such as polyvinyl chloride which may have a suitable plasticizer additive has a wide substantially flat sheet-like portion 68 and a downwardly depending locking portion 70. The sheet-like portion 68 preferably has a width greater than the height of inner ground engaging leg 24. The locking portion 70 has a downwardly depending leg element 74 and angularly rearwardly directed flanges 76, 78. The downwardly exposed surfaces of flanges 76, 78 provide a pilot surface for guiding the resilient locking portion 70 into sealed receiving channel 56.

Figure 7:
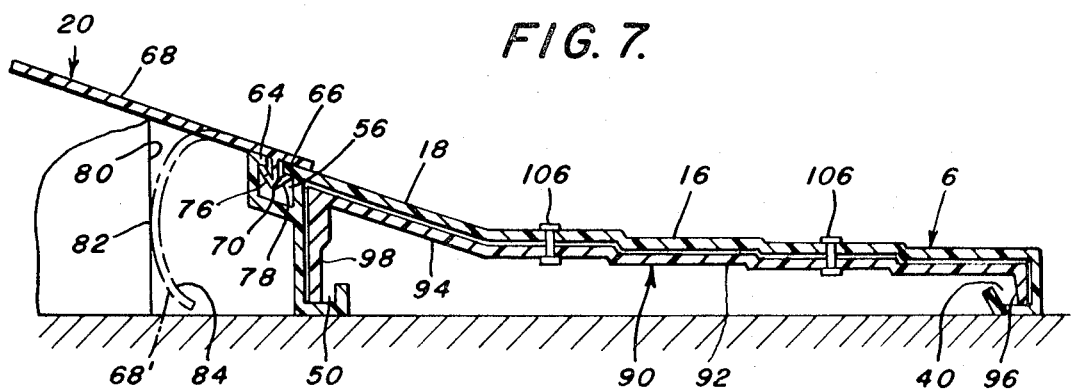
FIG. 7 shows a cross sectional elevation of the joint taken through 7—7 of FIG. 6.

As is shown in FIG. 7, flanges 76, 78 engage the undersurface of flanges 64, 66 of channel 56 and thereby provide resilient mechanical interengagement between the locking portion and the seal receiving channel. It is noted that when the sealing element 20 is locked in this position the sheet-like element prior to sealing engagement with the wall structure assumes a generally straight angular disposition substantially of the same orientation as inner portion 18. As is shown in dotted lines in FIG. 7 the sheet-like portion 68 is preferably urged downwardly into resilient sealing engagement with the vertical wall surface 80 in such a fashion that upper surface 82 is in surface to surface contact with the vertical wall surface of sheet-like portion 68. If desired, the sealing element may be bent upwardly to provide resilient sealing engagement between undersurface 84 of sheet-like portion 68 and vertical wall surface 80 at a higher level than that shown in FIG. 7.

Figure 4:
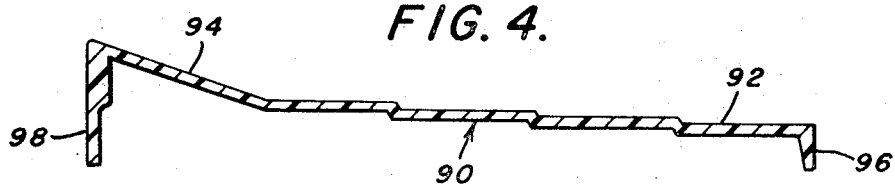
FIG. 4 illustrates a cross sectional view of the splicing element of this invention.

One form of splice element 90 contemplated by this invention is shown in FIGS. 4 and 7. The splicing element in general has an upper portion configurated in generally complementary fashion with respect to the frame member 6, with respect to which it is adapted to assume interlocking underlying relationship. The splice element has an outer generally horizontal section 92 and an inner upwardly and inwardly inclined section 94. The angle of inclination of the intersection 94 of splice element 90 is preferably substantially equal to the angle of inclination of inner portion 18. Horizontal outer section 92 has substantially the same outwardly downwardly stepped contour as outer portion 16 of frame 6. An outer downwardly directed leg 96 depends from outer section 92 and an inner downwardly directed leg 98 extends from intersection 94. The spacing between legs 96, 98 is substantially equal to the spacing between channels 44, 50 of frame 6.

Figure 6:
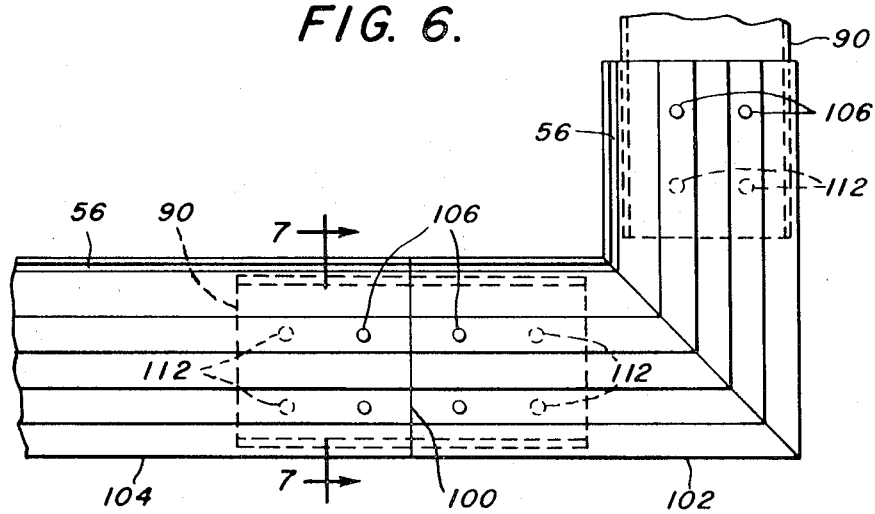
FIG. 6 illustrates a fragmentary plan view of a corner and guard element butt joint of this invention.

As is shown in FIGS. 6 and 7, it is contemplated that splice element 90 will be partially received within adjacent guard and corner elements which are abutted to establish a butt joint 100. In this position, as is shown in FIG. 7, inner leg 98 of splice member 90 will be received and retained within channel 50 and outer leg 96 is received within channel 40. It will be noted that the legs 96, 98 are positioned in spaced relationship with respect to the underlying earth. Also, inner portion 94 is in substantially coextensive underlying relationship and may supportingly contact inner section 18 of frame 6. In like manner outer section 92 is positioned in substantially coextensive underlying relationship with respect to outer section 16. In effecting joint 100 shown in FIG. 6 the most convenient manner would be to insert one end of splice element 90 into either guard element 104 or corner element 102. After this has been accomplished the other element 102, 104 may be slidingly moved into engagement with splice element 90. Fasteners 106 may then be employed to secure the splice element 90 to each of the elements 102, 104. These fasteners may be any convenient fastening means such as pop rivets, bolts or screws. If desired, preformed holes may be provided in the splicing member 90 in order to facilitate ease of fastener insertion. These fasteners prevent relative sliding movement in a joint separating direction.

It will be appreciated that while the specific splice joint illustrated shows a joint between a guard element 104 and corner element 102 in large installations where it may frequently be necessary or desirable to establish similar joints between two guard elements 104 this may be accomplished in the same manner. It will be appreciated that as a result of the underlying slidingly engaged position which the splice element 90 assumes with respect to the frame element it is entirely concealed from view and the elevation of adjacent joint elements 102, 104 is substantially equal, thereby establishing a completely uniform exterior flat appearance.

Figure 8:
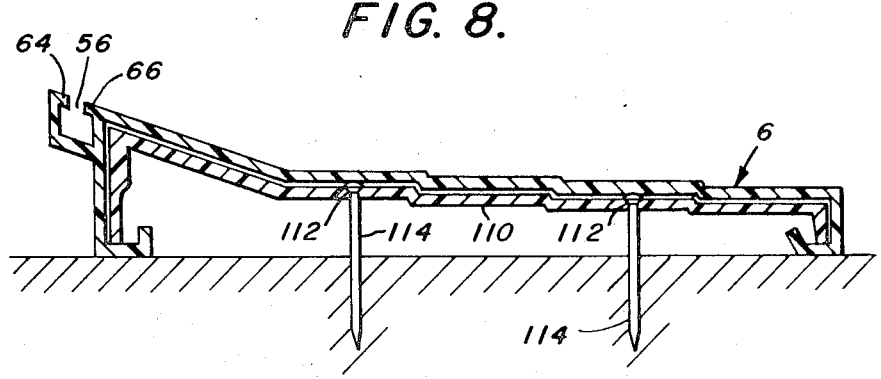
FIG. 8 illustrates a form of anchoring means contemplated by this invention.

The structure of this invention may be employed with anchoring elements which penetrate into the underlying earth and add to the stability of positioning of the frame element with respect to the earth. As is shown in FIG. 8, and anchor support element 110 which may have substantially the same cross sectional configuration as splice element 90 and may in fact serve also as a splice element has openings 112 therethrough and receives elongated spike-like anchoring elements 114. The heads of the spike elements 114 are preferably substantially coplanar with respect to the upper surface of element 110 in order to avoid mechanical interference with overlying frame member 6. The anchor support element 110 is received within frame element 6 in substantially the same fashion as the splice element. As is shown in FIG. 7, splice element 90 may be provided with preformed openings 112 of anchor elements. Thus, the spike-like anchors 114 may be secured at a joint location through the splice element or may be secured at a position remote from the joint by means of independent anchor support elements which preferably have similar structure to the splice element 90. It will be appreciated that these spike-like elements 114 and the anchor support element 110 are concealed from external view and therefore do not impair the uniform desirable aesthetically pleasing appearance of the protective frame element.

While the frame element may be manufactured from numerous materials it is preferable and economical to employ a substantially rigid plastic material such as polyvinyl chloride, high density polyethylene or polyproplene.

It will therefore be appreciated that the vegetation inhibiting member of this invention provides an effective sealed structural retardant to undesired vegetation growth against exterior surfaces and more specifically generally vertical wall-like surfaces. Where a multi-sided object is to be completely protected the guard elements and corner elements of this invention may be suitably joined to provide a closed frame-like vegetation inhibiting structure. This may readily be accomplished by a uniquely designed splice element which is adapted to be slidingly received within adjacent frame elements to provide a concealed butt type joint. The exterior appearance of the frame member provides a uniform aesthetically pleasing structure. The frame is provided with a resilient sealing strip which is substantially coextensive therewith and adapted to effectively resiliently seal substantially coextensively against the wall-like surfaces. In addition, concealed anchoring means may be secured to spike-like elements or anchor support elements to provide hidden means for effective ground securement.

It will further be appreciated that the vegetation inhibiting member of this invention may be economically manufactured and readily installed by means of unskilled or semi-skilled workers. The vegetation inhibiting member may be economically manufactured from plastic materials by conventional means such as extrusion or molding.

While for purposes of specific illustration reference has been made throughout the discussion to a tombstone-like grave marking structure, it will be appreciated that the invention may be employed with a number of types of structures having exterior wall-like surfaces adjacent to earth or similar materials capable of supporting vegetation.

Whereas particular embodiments of the invention have been described above for purposes of illustration, it will be evident to those skilled in the art that numerous varia-

I claim:

1. A vegetation inhibiting member for protective placement adjacent exterior wall-like surfaces comprising:
   at least one guard element having a substantially horizontal outer portion and an adjacent upwardly and inwardly directed inner portion,
   said outer portion having a downwardly depending outer ground engaging leg,
   said inner portion having a downwardly depending inner ground engaging leg,
   said inner portion having a seal receiving channel, and
   sealing means for assuming sealing contact with said wall-like surface having one end secured within said channel and extending upwardly and inwardly therefrom, whereby said guard element is adapted to define a vegetation free region between said wall-like surface and said outer ground engaging leg.

2. The vegetation inhibiting structure of claim 1 wherein:
   said seal receiving channel being generally upwardly open,
   said vegetation inhibiting member is a closed four sided frame defining a generally rectangular opening for sealed surrounding engagement with the surfaces of a multi-sided structure,
   said frame having a fixed size and a uniform exterior appearance,
   said frame having elongated guard elements and corner elements having a substantially identical cross sectional configuration, and
   splice means joining said guard elements to said corner elements.

3. The vegetation inhibiting structure of claim 2 wherein:
   said frame is adapted for protective engagement with a generally rectangular grave marking structure,
   said outer ground engaging legs terminate in a flange having an inwardly directed portion and a generally upwardly directed free end which provide an upwardly open outer splice receiving channel, and
   said inner ground engaging legs terminate in a flange having an outwardly directed portion and a generally upwardly directed free end which provide an upwardly open inner splice.

4. The vegetation inhibiting structure of claim 3 wherein:
   four said splice elements join each said guard element to at least one of said corner elements and at least two said splice elements each joining two said guard elements to each other to define one side of said frame.

5. The vegetation inhibiting structure of claim 3 wherein:
   said frame overlying and concealing said splice element,
   said splice element having an upper surface of substantially complementary configuration with respect to the overlying frame portion,
   said sealing means has a sealing element for each side of said frame having a sheet-like body portion and a depending locking element, and
   said seal receiving channel receiving said locking element in a mechanical interference fit.

6. The vegetation inhibiting structure of claim 5 wherein:
   said frame is composed of a substantially rigid plastic material,
   each said sealing element is composed of a resilient plastic material,
   said seal receiving channel has a restricted throat defined by confronting ends of a pair of flanges disposed at the upper extremity of said channel,
   said locking means has a downwardly depending leg having angularly rearwardly diverging sections on opposed sides thereof adapted to serve as pilot surfaces in inserting said locking means into said seal receiving channel and resist relative separation of said locking means from said channel, and
   each said seal element longitudinally substantially coextensive with each said seal receiving channel.

7. The vegetation inhibiting structure of claim 6 wherein:
   said sheet-like body portion of said sealing elements has a width greater than the height of said inner ground engaging leg of said frame inner portion,
   said seal receiving channel disposed inwardly with respect to said inner ground engaging leg, and
   the throat defining flanges of said seal receiving channel have a downwardly and outwardly directed slope substantially identical with that of said inner portion of said frame.

8. The vegetation inhibiting structure of claim 3 including:
   ground anchoring means adapted to be concealed from view when said frame is installed,
   said ground anchoring means having downwardly projecting elements underlying said frame member and adapted to extend into the earth which will underlie said frame,
   said splice means including a splice element having a substantially horizontal outer splice sector terminating in a downwardly directed outer splice leg,
   said splice element having an upwardly and inwardly inclined inner splice sector terminating in a downwardly directed inner splice leg,
   each said splice element extending into one said guard element and into a corner element abutting said guard element and establishing a butt joint between said elements,
   said outer splice leg received within said outer splice receiving channel,
   said inner splice leg received within said inner splice receiving channel, and
   fastening means securing said splice means to said guard element and said corner elements.

9. The vegetation inhibiting structure of claim 8 wherein:
   said downwardly projecting elements depend from said splice elements intermediate said inner and outer splice legs.

10. The vegetation inhibiting structure of claim 8 wherein:
    at least one anchor supporting element having substantially the same cross sectional configuration as said splice element secured to a portion of said frame intermediate said butt joints and depending downwardly therefrom.

References Cited

UNITED STATES PATENTS

| | | | |
|---|---|---|---|
| 1,916,494 | 7/1933 | Schrickel | 47—33 |
| 2,242,266 | 5/1941 | Scales | 47—33 UX |
| 3,281,988 | 11/1966 | Cohen | 47—33 |
| 3,545,127 | 8/1968 | Jensen | 47—33 |

ROBERT E. BAGWILL, Primary Examiner